United States Patent
Koch et al.

(10) Patent No.: US 11,052,815 B2
(45) Date of Patent: Jul. 6, 2021

(54) SNOWPLOW LIGHT CONTROL SYSTEM

(71) Applicants: Timothy G. Koch, Slinger, WI (US);
Wilhelm F. Von Menze, Lino Lakes, MN (US); Jacob R. Brehmer, Jackson, WI (US); Terry C. Wendorff, Slinger, WI (US)

(72) Inventors: Timothy G. Koch, Slinger, WI (US);
Wilhelm F. Von Menze, Lino Lakes, MN (US); Jacob R. Brehmer, Jackson, WI (US); Terry C. Wendorff, Slinger, WI (US)

(73) Assignee: Sno-Way International, Inc., Hartford, WI (US)

( * ) Notice: Subject to any disclaimer, the term of this patent is extended or adjusted under 35 U.S.C. 154(b) by 0 days.

(21) Appl. No.: 16/674,808

(22) Filed: Nov. 5, 2019

(65) Prior Publication Data

US 2020/0070713 A1    Mar. 5, 2020

Related U.S. Application Data

(62) Division of application No. 15/908,288, filed on Feb. 28, 2018, now Pat. No. 10,538,194.

(51) Int. Cl.
*B60Q 1/14* (2006.01)
*B60Q 1/00* (2006.01)

(52) U.S. Cl.
CPC .......... *B60Q 1/143* (2013.01); *B60Q 1/0023* (2013.01); *B60Q 1/0076* (2013.01); *B60Q 1/1446* (2013.01)

(58) Field of Classification Search
None
See application file for complete search history.

(56) References Cited

U.S. PATENT DOCUMENTS

| | | | |
|---|---|---|---|
| 5,420,480 A | 5/1995 | Knepel et al. | |
| 6,005,300 A | 12/1999 | Kelly | |
| 6,201,318 B1 * | 3/2001 | Guillory | G01R 31/44 307/10.1 |
| 6,265,829 B1 | 7/2001 | Perdec | |
| 6,504,306 B2 | 1/2003 | Menze | |
| 7,137,724 B2 | 11/2006 | Menze et al. | |
| 7,400,058 B1 | 7/2008 | Wayne et al. | |
| 8,375,607 B2 | 2/2013 | Menze | |
| 9,194,091 B2 | 11/2015 | Moon, Jr. et al. | |
| 9,278,645 B1 | 3/2016 | Orazem | |
| 9,346,394 B1 | 5/2016 | Orazem | |
| 9,751,452 B2 | 9/2017 | Orazem | |
| 2002/0171291 A1 | 11/2002 | Wayne et al. | |
| 2008/0073090 A1 | 3/2008 | Harris | |
| 2012/0169232 A1 * | 7/2012 | Behr | H05B 45/18 315/82 |
| 2016/0207447 A1 | 7/2016 | Orazem | |

(Continued)

*Primary Examiner* — Amy Cohen Johnson
*Assistant Examiner* — Jianzi Chen
(74) *Attorney, Agent, or Firm* — Reinhart Boerner Van Deuren P.C.

(57) ABSTRACT

An auxiliary lighting system for an auxiliary device and methods are provided. The auxiliary lighting system senses the operational state of various ones of the vehicle lights of the vehicle and operably controls the operational state of various auxiliary lights based on the operational state of one or more of the vehicle lights. The method includes controlling the auxiliary lighting system based on the operational state of the vehicle lights.

16 Claims, 8 Drawing Sheets

(56) References Cited

U.S. PATENT DOCUMENTS

| | | |
|---|---|---|
| 2016/0207451 A1 | 7/2016 | Orazem |
| 2016/0212829 A1 | 7/2016 | Orazem |
| 2017/0015237 A1* | 1/2017 | Okumura ................. B60Q 1/18 |
| 2017/0361766 A1* | 12/2017 | Orazem ................... B60Q 1/18 |

* cited by examiner

SNOWPLOW LIGHT CONTROL SYSTEM

CROSS-REFERENCE TO RELATED PATENT APPLICATIONS

This patent application is a divisional of U.S. patent application Ser. No. 15/908,288, filed Feb. 28, 2018, the entire teachings and disclosure of which are incorporated herein by reference thereto.

FIELD OF THE INVENTION

This invention generally relates to auxiliary lighting systems for use with auxiliary devices useable with a vehicle and methods of operating auxiliary lighting systems.

BACKGROUND OF THE INVENTION

An auxiliary devices mountable to vehicles often have their own auxiliary lighting system. For example, one such auxiliary device is a snowplow. A snowplow is typically mounted to the front of a vehicle.

Unfortunately, due to the overall size of the snowplow, the snowplow may obstruct the headlights of the vehicle. Obstruction of the headlights of the vehicle can prevent adequate light from illuminating the ground in front of the vehicle for the operator to properly see what is in front of the vehicle. Obstruction of the headlights can prevent oncoming vehicles that are traveling toward the vehicle with the snowplow from properly seeing the vehicle or the snowplow. Obstruction of the headlights can also result in the light produced from the vehicle headlights to reflect back at the operator of the vehicle making it more difficult for the operator of the vehicle to drive the vehicle. Thus, the auxiliary device will typically include its own auxiliary lighting system such that the issues associated with obstructing the vehicle headlights is mitigated.

While the auxiliary lighting system can solve or mitigate the obstruction issues, it creates a new source of problems. More particularly, the lights of the auxiliary lighting system need to be able to be controlled by the operator of the vehicle. Attempts have been made to create wiring harnesses that directly connect into the vehicle lighting system such that the power is directed to the vehicle lights, e.g. the vehicle headlights or vehicle marker lights, is directly sent to the auxiliary lighting system lights, e.g. auxiliary headlights or auxiliary marker lights. These wiring harnesses may be connected into connectors provided in the vehicle lighting system or may be directly spliced into the vehicle lighting system.

Unfortunately, as vehicles have become more sophisticated, directly connecting into the vehicle lighting system in this manner has caused other problems. More particularly, many vehicle computers will monitor the state of the vehicle lights to determine whether or not they are properly operating. Unfortunately, when the auxiliary lighting system connects into the vehicle lighting system, many vehicle computers can sense a change in the vehicle lighting system and create a fault or error.

Another issue can simply be the difficulty in accessing the various wires and connectors of the vehicle lighting system to properly connect into the vehicle lighting system in a time efficient manner.

One attempt to overcome this problem is illustrated in U.S. Pat. No. 9,751,452 entitled Method and Apparatus for Installing and Operating an Auxiliary Lighting System Using a Vehicle Light Plug. This system attempts to get around the issue identified above by using the trailer plug designed to send power to and to control marker and turn signal lights on a trailer being towed by the vehicle. Here, the vehicle is expecting a particular load on that set of wiring such that it would not identify connection to that plug as an error or fault in the system.

As vehicles have become even more sophisticated, many vehicles are now including rear backup cameras as well as rear backup sensors for assisting an operator in driving the vehicle in reverse. Unfortunately, some vehicles will deactivate those features when it is believed that a trailer (or other auxiliary device) is attached to the rear of the vehicle. Some vehicles make this determination by sensing that the vehicle trailer plug is connected to an auxiliary device. Thus, the concept of the '452 patent has its problems as well as it will, in some vehicles, deactivate the rear backup cameras and/or rear backup sensors unnecessarily.

A further problem with this system is that typically vehicles only have these trailer plug, or similar plugs, at the rear of the vehicle. This requires a very long wiring harness to extend from the rear of the vehicle to the front of the vehicle. Further, the plug is at the rear of the vehicle rather than at the front of the vehicle in the engine compartment exposing the connection to potential damage.

A final problem related to this system is that control of the auxiliary headlights of the auxiliary lighting system between bright and dim settings requires use of an auxiliary switch positioned within the cab of the vehicle.

The present invention is directed at improvements over the current state of the art. Embodiments may overcome one or more of the problems outlined above.

BRIEF SUMMARY OF THE INVENTION

Embodiments provide new and improved auxiliary lighting systems for use with auxiliary devices for vehicles and methods of controlling auxiliary lighting systems.

In one embodiment, an auxiliary lighting system for use with an auxiliary device useable with a vehicle is provided. The vehicle has a vehicle lighting system power is supplied from m that includes a vehicle headlight that includes a vehicle low beam light and a vehicle high beam light. The vehicle lighting system may include a manually actuable headlight control for switching between operational states of the vehicle headlight.

The auxiliary lighting system includes an auxiliary high beam light, an auxiliary low beam light, a vehicle headlight sensor configured to sense an operational state of the vehicle headlight, and an auxiliary light controller. The auxiliary light controller operably connects to the vehicle headlight sensor to receive a vehicle headlight operational state signal related to the operational state of the vehicle headlight from the vehicle headlight sensor. The auxiliary light controller is operable to control an operational state of the auxiliary high beam light based on the vehicle headlight operational state signal and operable to control the operational state of the auxiliary low beam light based on the vehicle headlight operational state signal.

In one embodiment, the vehicle headlight sensor is a Hall Effect sensor that can sense a magnetic field of a vehicle headlight wire associated with activating the vehicle headlight.

In one embodiment, the vehicle headlight sensor is a photoelectric device that senses light intensity of the vehicle headlight.

In one embodiment, the vehicle headlight sensor is electrically connected to a vehicle headlight wire associated with activating the vehicle headlight. The vehicle headlight sensor senses an electrical characteristic such as voltage or amperage.

In one embodiment, the vehicle headlight sensor is a switch positionable proximate the manually actuable headlight control, the switch changing operational states upon manipulation of the manually actuable headlight control to sense a change in position of the manually actuable headlight control to indicate the operational state of the vehicle headlights.

In one embodiment, the auxiliary light controller includes a power control circuit that is operably connectable to a power source and is connected to the auxiliary high beam light and the auxiliary low beam light. The power control circuit (also referred to as a power distribution circuit) has a low beam state wherein power is supplied from the power source to the auxiliary low beam light when the power control circuit is connected to the power source. The power control circuit a high beam state wherein power is supplied from the power source to the auxiliary high beam light when the power control circuit is connected to the power source. The power control circuit switches between the low beam state and the high beam state upon a change in the vehicle headlight operational state signal.

In one embodiment, the vehicle lighting system further includes a vehicle marker light and a manually actuable vehicle light control having a vehicle marker light on state wherein the vehicle marker light is active and the vehicle headlights are inactive and a headlight on state wherein the vehicle headlight is active. The auxiliary lighting system further includes a vehicle marker light sensor. The vehicle marker light sensor is configured to sense an operational state of the vehicle marker light. The vehicle marker light sensor is operably connected to the auxiliary light controller to send a vehicle marker light operational state signal to the auxiliary light controller. The auxiliary light controller activates at least one of the auxiliary high beam light and the auxiliary low beam light when the vehicle marker light operational state signal indicates the vehicle marker light is active.

In one embodiment, the vehicle marker light sensor is a hall effect sensor that can sense a magnetic field of a vehicle marker light wire associated with activating the vehicle marker light.

In one embodiment, the vehicle marker light sensor is a photoelectric device that senses light intensity of the vehicle marker light.

In one embodiment, the vehicle marker light sensor is electrically connected to a vehicle marker light wire associated with the vehicle marker light. The vehicle marker light sensor senses an electrical characteristic such as voltage or amperage.

In one embodiment, an auxiliary marker light, wherein the auxiliary light controller is operable to control power to the auxiliary marker light. The auxiliary light controller controls power to the auxiliary marker light such that the auxiliary marker light to match the operational state of the vehicle marker light.

In one embodiment, the vehicle lighting system further includes a vehicle marker light and a manually actuable vehicle light control having a vehicle marker light on state wherein the vehicle marker light is active and the vehicle headlights are inactive and a headlight on state wherein the vehicle headlight is active. The auxiliary lighting system further includes a vehicle marker light sensor. The vehicle marker light sensor is configured to sense an operational state of the vehicle marker light. The vehicle marker light sensor is operably connected to the auxiliary light controller to send a vehicle marker light operational state signal to the auxiliary light controller. The auxiliary light control has an auxiliary light control on state wherein at least one of the auxiliary high beam light and the auxiliary low beam light is active and an auxiliary light control off state wherein both of the auxiliary high beam light and the auxiliary low beam light are inactive. The auxiliary light control switches from the auxiliary light control off state to the auxiliary light control on state upon receipt of a vehicle marker light operational state signal indicating that the vehicle marker light is active.

In one embodiment, the auxiliary light control switches from the auxiliary light control on state to the auxiliary light control off state when the auxiliary light control receives a vehicle marker light operational state signal indicating the vehicle marker light is inactive for at least a predetermined length of time.

In one embodiment, the auxiliary light control does not switch from the auxiliary light control on state to the auxiliary light control off state when the auxiliary light control receives a vehicle marker light operational state signal indicating the marker light is inactive for less than the predetermined length of time.

In one embodiment, when the auxiliary light controller operably changes the auxiliary high beam light to an active state based on the vehicle headlight operational state signal, the auxiliary light controller operably changes the auxiliary low beam light to an inactive state. When the auxiliary light controller operably changes the auxiliary high beam light to an inactive state based on the vehicle headlight operational state signal, the auxiliary light controller operably changes the auxiliary low beam light to an active state.

In one embodiment, the vehicle headlight sensor is not electrically connected to a vehicle headlight wire associated with activating the vehicle headlight.

In one embodiment, the vehicle headlight sensor is not electrically connected into the vehicle lighting system to sense the operational state of the vehicle headlight In another embodiment, a method of operating an auxiliary lighting system for use with an auxiliary device useable with a vehicle is provided. The vehicle has a vehicle lighting system including a vehicle headlight that includes a vehicle low beam light and a vehicle high beam light and a manually actuable headlight control for switching between operational states of the vehicle headlight. The method includes sensing, with a vehicle headlight sensor, an operational state of the vehicle headlight. The method includes sending, to an auxiliary light controller, a vehicle headlight operational state signal indicating the operational state of the vehicle headlight. The method includes receiving, by the auxiliary light controller, the vehicle headlight operational state signal. The method includes switching, with the auxiliary light controller, an operational state of an auxiliary low beam light and an operational state of an auxiliary high beam light based on the vehicle headlight operational state signal. The step of switching may occur based on a sensed change in the vehicle headlight operational state signal.

In one embodiment, the vehicle headlight sensor is a Hall Effect sensor that can sense a magnetic field of a vehicle headlight wire associated with activating the vehicle headlight. Sensing the operational state of the vehicle headlight may not require electrically connecting to the vehicle headlight (directly or indirectly).

In one embodiment, the vehicle headlight sensor is a photoelectric device that senses light intensity of the vehicle headlight. Sensing the operational state of the vehicle headlight does not require electrically connecting to the vehicle headlight (directly or indirectly).

In one embodiment, the vehicle headlight sensor is electrically connected to a vehicle headlight wire associated with activating the vehicle headlight. The vehicle headlight sensor senses an electrical characteristic such as voltage or amperage.

In one embodiment, the vehicle headlight sensor is a switch positionable proximate the manually actuable headlight control. The switch changing operational states upon manipulation of the manually actuable headlight control to sense a change in the operational state of the vehicle headlights.

In one embodiment, the auxiliary light controller includes a power control circuit that is operably connectable to a power source and is connected to the auxiliary high beam light and the auxiliary low beam light. The power control circuit has a low beam state wherein power is supplied from the power source to the auxiliary low beam light when the power control circuit is connected to the power source and a high beam state wherein power is supplied from the power source to the auxiliary high beam light when the power control circuit is connected to the power source. The method further includes switching, by the power control circuit, between the low beam state and the high beam state in response to a change in the vehicle headlight signal.

In one embodiment, the vehicle lighting system further includes a vehicle marker light and a manually actuable vehicle light control having a vehicle marker light on state wherein the vehicle marker light is active and the vehicle headlights are inactive and a headlight on state wherein the vehicle headlight is active. The auxiliary lighting system further includes a vehicle marker light sensor configured to sense changes in the operational state of the vehicle marker light. The vehicle marker light sensor is operably connected to the auxiliary light controller to send a vehicle marker light on signal to the auxiliary light controller upon sensing activation of the vehicle marker light. The method further includes activating at least one of the auxiliary high beam light and the auxiliary low beam light upon receipt of the vehicle marker light on signal.

In one embodiment, the vehicle marker light sensor is a hall effect sensor that can sense a magnetic field of a vehicle marker light wire associated with activating the vehicle marker light. Sensing the operational state of the vehicle marker light includes sensing the magnetic field of the vehicle marker light wire associated with activating the vehicle marker light. Sensing the operational state of the vehicle marker light does not require electrically connecting to the vehicle marker light.

In one embodiment, the vehicle marker light sensor is a photoelectric device that senses light intensity of the vehicle marker light. Sensing the operational state of the vehicle marker light includes sensing the light intensity of the vehicle marker light. Sensing the operational state of the vehicle marker light does not require electrically connecting to the vehicle marker light.

In one embodiment, the vehicle marker light sensor is electrically connected to a vehicle marker light wire associated with the vehicle marker light. The vehicle marker light sensor senses an electrical characteristic such as voltage or amperage.

In one embodiment, an auxiliary marker light is provided. The method further includes controlling power, with the auxiliary light controller, to the auxiliary marker light to match the operational state of the vehicle marker light.

In one embodiment, the vehicle headlight sensor is not electrically connected to a vehicle headlight wire associated with activating the vehicle headlight. Sensing the operational state of the vehicle headlight does not require electrically connecting to the vehicle headlight.

In one embodiment, switching, with the auxiliary light controller, an operational state of an auxiliary low beam light and an operational state of an auxiliary high beam light upon a change in the vehicle headlight operational state signal includes: changing the auxiliary low beam light to an inactive state when the auxiliary light controller operably changes the auxiliary high beam light to an active state based on the vehicle headlight operational state signal, and changing the auxiliary low beam light to an active state when the auxiliary light controller operably changes the auxiliary high beam light to an inactive state based on the vehicle headlight operational state signal.

In one embodiment, sensing, with a vehicle headlight sensor, an operational state of the vehicle headlight does not require electrically connecting into the vehicle lighting system to sense the operational state of the vehicle headlight.

In another embodiment, an auxiliary lighting system for use with an auxiliary device useable with a vehicle is provided. The vehicle has a vehicle lighting system including a vehicle marker light, a vehicle headlight that includes a vehicle low beam light and a vehicle high beam light, a manually actuable headlight control for switching between operational states of the vehicle headlight and a manually actuable vehicle light control having a vehicle marker light on state wherein the vehicle marker light is active and the vehicle headlights are inactive and a headlight on state wherein the vehicle headlight is active. The auxiliary lighting system includes an auxiliary headlight, a marker light sensor configured to sense an operational state of the vehicle marker light, and an auxiliary light controller. The an auxiliary light controller is operably connected to the vehicle marker light sensor to receive a marker light operational state signal related to the operational state of the vehicle marker light from the vehicle marker light sensor. The auxiliary light controller is operable to activate the auxiliary headlight when the vehicle marker light operational state signal indicates that the vehicle marker light is active.

In one embodiment, the vehicle marker light sensor is a Hall Effect sensor that can sense a magnetic field of a vehicle marker light wire associated with activating the vehicle marker light without electrically connecting to the vehicle marker light or the vehicle marker light wire.

In one embodiment, the vehicle marker light sensor is a photoelectric device that senses light intensity of the vehicle marker light without electrically connecting to the vehicle marker light or the vehicle marker light wire.

In one embodiment, the vehicle marker light sensor is electrically connected to the vehicle marker light or vehicle marker light wire associated with activating the vehicle marker light.

In one embodiment, the vehicle marker light sensor is not electrically connected to the vehicle lighting system to sense the operation state of the vehicle marker light.

In one embodiment, the system includes an auxiliary marker light. The auxiliary light controller is operable to control power to the auxiliary marker light. The auxiliary light controller controls power to the auxiliary marker light such that the auxiliary marker light matches the operational state of the vehicle marker light. Notably, some slight time delay and variation in operation is permissible such that it does not have to be an exact match.

In one embodiment, the auxiliary light control has an auxiliary light control on state wherein the auxiliary headlight is active and an auxiliary light control off state wherein the auxiliary headlight is inactive. The auxiliary light control switches from the auxiliary light control on state to the auxiliary light control off state when the auxiliary light control receives a vehicle marker light operational state signal indicating the vehicle marker light is inactive for at least a predetermined length of time.

In one embodiment, the auxiliary light control does not switch from the auxiliary light control on state to the auxiliary light control off state when the auxiliary light control receives a vehicle marker light operational state signal indicating the marker light is inactive for less than the predetermined length of time.

In another embodiment, a method of controlling auxiliary lighting system for use with an auxiliary device useable with a vehicle is provided. The vehicle has a vehicle lighting system including a vehicle marker light, a vehicle headlight that includes a vehicle low beam light and a vehicle high beam light, a manually actuable headlight control for switching between operational states of the vehicle headlight and a manually actuable vehicle light control having a vehicle marker light on state wherein the vehicle marker light is active and the vehicle headlights are inactive and a headlight on state wherein the vehicle headlight is active. The method includes sensing, with a vehicle marker light sensor, an operational state of the vehicle marker light. The method includes sending, to an auxiliary light controller, a vehicle marker light operational state signal indicating the operational state of the vehicle marker light. The method includes receiving, by the auxiliary light controller, the vehicle marker light operational state signal. The method includes activating, with the auxiliary light controller, an auxiliary headlight of the auxiliary lighting system when the vehicle marker light operational state signal indicates that the vehicle marker light is active.

In one embodiment, the vehicle marker light sensor is a Hall Effect sensor that can sense a magnetic field of a vehicle marker light wire associated with activating the vehicle marker light. Sensing the operational state of the vehicle marker light does not require electrically connecting to the vehicle marker light or the vehicle marker light wire.

In one embodiment, the vehicle marker light sensor is a photoelectric device that senses light intensity of the vehicle marker light. Sensing the operational state of the vehicle marker light does not require electrically connecting to the vehicle marker light or the vehicle marker light wire.

In one embodiment, the vehicle marker light sensor is electrically connected to a vehicle marker light wire associated with activating the vehicle marker light. The vehicle marker light sensor senses an electrical characteristic such as voltage or amperage.

In one embodiment, the vehicle marker light sensor is not electrically connected to the vehicle lighting system to sense the operation state of the vehicle marker light.

In one embodiment, the method includes controlling an auxiliary marker light operably coupled to the auxiliary light controller to match the operational state of the vehicle marker light.

In one embodiment, the method further includes switching, by the auxiliary light control, from an auxiliary light control on state wherein the auxiliary headlight is active to an auxiliary light control off state wherein the auxiliary headlight is inactive when the auxiliary light control receives a vehicle marker light operational state signal indicating the vehicle marker light is inactive for at least a predetermined length of time.

In one embodiment, the method includes maintaining the auxiliary light control in the auxiliary light control on state when the auxiliary light control receives a vehicle marker light operational state signal indicating the marker light is inactive for less than the predetermined length of time.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
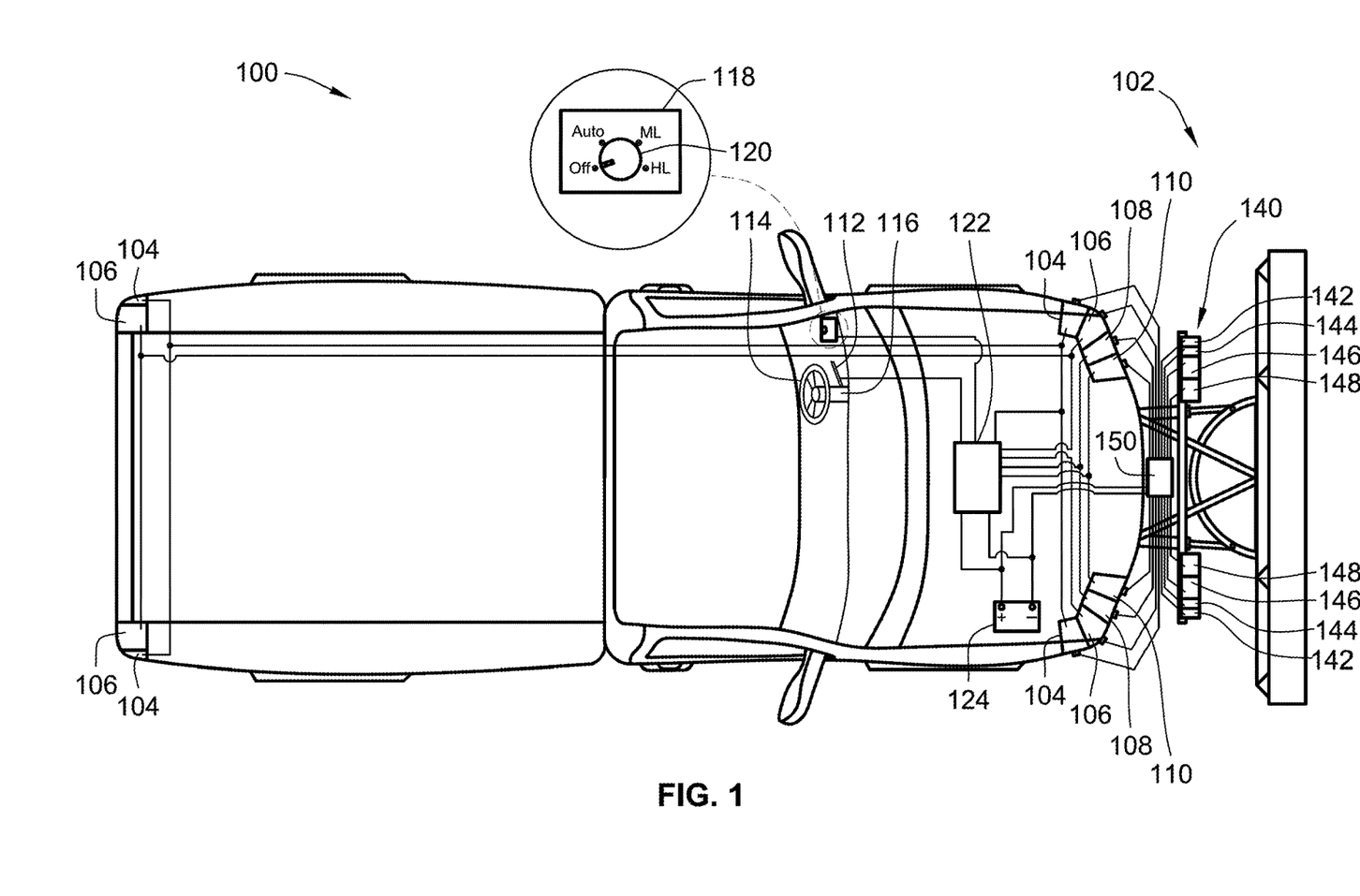
FIG. 1 is a schematic top illustration of a vehicle having an auxiliary device attached and an auxiliary lighting system.

FIG. 1 illustrates a simplified illustration of a vehicle 100 having an auxiliary device 102 useable with the vehicle 100 attached to a front of the vehicle 100. In this embodiment, the auxiliary device 102 is a snowplow. However, other auxiliary devices could be used such as a sweeper. Further, the vehicle 100 is illustrated as a pick-up truck but could be other vehicles such as utility vehicles or a 4-wheeler, for example.

The vehicle 100 includes a vehicle lighting system that may include a plurality of different lights and components and a variety of different configurations. In the illustrated vehicle, the lighting system includes vehicle marker lights 104, vehicle turn signal lights 106, and vehicle headlights that include vehicle high beam lights 108 and vehicle low beam lights 110. It is noted that some of the lights may be combined. For instance, a vehicle marker light and a vehicle turn signal light may be provided by a same light bulb. Such a light bulb may have different filaments for each function or be operated at different intensities or for different amounts of times for different functions. Further, a vehicle headlight may have a single bulb with different filaments for providing a vehicle high beam light and a vehicle low beam light. Alternatively, a vehicle headlight may be provided by two complete different bulbs with one providing the vehicle high beam light and one providing the vehicle low beam light. Further, a single filament may be provided for the vehicle headlight and the filament is operated at different intensities to provide a vehicle high beam light and a vehicle low beam light.

A vehicle headlight is a light used to provide significant illumination for illuminating the ground in front of the vehicle to assist the user in viewing objects over which the vehicle is driving. A vehicle turn signal light or vehicle marker light shall not be construed to be vehicle headlights. However, individual light bulbs of the vehicle may be operated in different manners to function as a particular light.

The vehicle lighting system also, in this embodiment, includes a manually actuable headlight control 112 for switching operational states of the vehicle headlight. More particularly, the manually actuable headlight control 112 can be used to switch between a high beam mode in which the vehicle high beam lights 108 are activated and a low beam mode in which the vehicle low beam lights 110 are activated. Again, in accordance with different style of headlights, this switching could include deactivating/activating one filament (e.g. a low beam filament or bulb) and activating/deactivating another filament (e.g. a high beam filament or bulb). Alternatively, this could include leaving a low beam filament/bulb activate at all times and simply toggling a high beam filament/bulb on (high beam mode) and off (low beam mode). Further yet, this could include using a single filament and increasing the power supplied to the filament/bulb to transition from a low beam mode to a high beam mode and reducing the power supplied to the filament/bulb to transition from the high beam mode to a low beam mode. As such, while separate portions are demarcated in the figures for the vehicle high and low lights 108, 110 for ease of illustration, they need not be so configured in operation. This high and low beam features are equally applicable to the auxiliary lighting system 140 described below.

The manually actuable headlight control 112 is typically located proximate the steering wheel 114 and is in the form of a stalk that sticks out from the steering column 116. The manually actuable headlight control 112. The manually actuable headlight control 112 can also be used to activate a desired vehicle turn signal light 106.

The vehicle lighting system may also include a manually actuable vehicle light control 118. The manually actuable vehicle light control can control the operational state of the vehicle lighting system. For instance, the manually actuable vehicle light control can have various different operating modes for the vehicle lighting system. In the illustrated embodiment, the manually actuable vehicle light control is a physical knob that can be rotated. However, it could take the form of a virtual selector that can be done by voice command or input using buttons as part of a digital system.

The manually actuable vehicle light control 118 can have an "Off" mode where none of the vehicle lights are activated. It can have an "Auto" mode where the vehicle lights, such as the vehicle head lights will automatically turn on and off depending on the environmental conditions (e.g. amount of ambient light) in which the vehicle is operating. It can have a "Marker Light" mode (illustrated as an "ML" in FIG. 1) in which the headlights are not activated but marker lights 104 are active. Further, it can have a "Head Light" mode (illustrated as "HL" in FIG. 1) in which the headlights are activated and, depending on the vehicle, the marker lights 104 may or may not be active.

The vehicle lighting system may include a vehicle light controller 122. In the illustrated embodiment, the vehicle light controller 122 is operably connected to the various vehicle lights including the vehicle marker lights 104, vehicle turn signal lights 106, and vehicle headlights that include vehicle high beam lights 108 and vehicle low beam lights 110 by appropriate wiring. The vehicle light controller 122 is also operably connected to the manually actuable headlight control 112 and the manually actuable vehicle light control 118. The vehicle light controller 122 is also operably connected to a power source 124 illustrated in the form of a battery that provides power to the vehicle lighting system to power the various vehicle lights and the vehicle light controller 122.

The vehicle light controller 122 can receive appropriate signals from the manually actuable headlight control 112 and the manually actuable vehicle light control 118 and determine which vehicle lights to properly power. The vehicle light controller 122 may be a plurality of modules (e.g. one for the vehicle headlights, one for the vehicle marker lights and one for the vehicle turn signal lights 106, or any combination thereof).

The vehicle lighting system, typically the vehicle light controller 122, may also include a "flash-to-pass" feature where when the manually actuable vehicle light control 118 is in a mode where the vehicle headlights would normally be deactivated that when the manually actuable vehicle headlight control 112 is manipulated to otherwise change the operational state of the vehicle headlight that a brief amount of power is sent to the vehicle headlight to cause the vehicle headlight to flash. This is often used when a user wants to signal to other vehicle operators that the user is going to make a passing maneuver. The vehicle light controller 122 will receive a signal from the manually actuable vehicle headlight control 112 that indicates a desire to change the operational state of the vehicle headlight and then cause such a vehicle headlight flash to occur. The flash may be any of the vehicle high beam lights 108, the vehicle low beam lights 110 or a combination thereof. The actuation of the manually actuable vehicle headlight control 112 is switched between fixed positions or is pushed to a different position and then it automatically springs back to its original position.

Embodiments of the invention provide an auxiliary lighting system 140 for use with the auxiliary device 102. The auxiliary lighting system 140 finds particular usefulness in providing auxiliary lighting when the vehicle lights of the vehicle lighting system are otherwise insufficient or blocked by the auxiliary device 102.

In the illustrated embodiment, the auxiliary lighting system 140 includes auxiliary marker lights 142, auxiliary turn signal lights 144, and auxiliary headlights that include auxiliary high beam lights 146 and auxiliary low beam lights 148 (referred to as a group as auxiliary lights 142, 144, 146, 148). The auxiliary lighting system 140 is operably connected to a power source to supply power to the various auxiliary lights. In this embodiment, the auxiliary lighting system 140 directly obtains power from the vehicle power source 124. The power to power the auxiliary lights 142, 144, 146, 148 is not provided by the vehicle lighting system. While this embodiment shares the vehicle battery to power both the vehicle lighting system and the auxiliary lighting system, a second power source could be provided to power the auxiliary lighting system 140.

An auxiliary light controller 150 is operably connected to the auxiliary lights 142, 144, 146, 148 to operably control the operational states of the auxiliary lights 142, 144, 146, 148. The auxiliary light controller 150 includes the appropriate internal circuitry to control power distribution to the auxiliary lights 142, 144, 146, 148 such that they auxiliary lights 142, 144, 146, 148 are appropriately powered and controlled for their desired operation.

The auxiliary lighting system 140 is configured to simulate at least one if not all of the lights of the vehicle lighting system so that the vehicle lighting system need not be relied upon when using the auxiliary device 102. This is particularly useful when the auxiliary device 102 obscures or otherwise reduces the effectiveness of the vehicle lights of the vehicle lighting system.

As noted above, due to the changes in complexity of vehicle lighting systems, directly connecting auxiliary lights into the vehicle lighting system can cause undesirable consequences and difficulties. Embodiments of the auxiliary lighting system of the instant invention attempt to overcome or reduce the disadvantages related to prior auxiliary lighting systems.

It is a feature of some embodiments, that the auxiliary lighting system 140 can be activated and controlled by using manually actuable vehicle controls that are part of the vehicle lighting system. More particularly, one or more of the auxiliary lights 142, 144, 146, 148 may be activated and/or manipulated using the manually actuable headlight control 112 and/or the manually actuable vehicle light control 118. Further yet, the auxiliary lighting system 140 may be activated using the manually actuable headlight control 112. While not necessary in all embodiments, it is preferred, if the auxiliary lighting system 140 can be implemented without having to electrically connect to any of the vehicle lighting system. Note, the power source shall not be considered part of the vehicle lighting system and thus sharing a same power source, e.g. battery, shall not be considered electrically connecting the auxiliary lighting system 140 to the vehicle lighting system.

To facilitate operation of the auxiliary lighting system 140, the auxiliary lighting system 140 includes a plurality of sensors that sense the operational state of various ones of the vehicle lights. In the illustrated embodiment, the auxiliary lighting system 140 includes vehicle marker light sensors 160, vehicle turn signal light sensors 162, vehicle head light sensors in the form of vehicle high beam light sensors 164 and vehicle low beam light sensors 166. Each sensor 160, 162, 164, 166 operably senses the operational state of the corresponding vehicle light. Further, each vehicle light sensor 160, 162, 164, 166 operably sends an operational state signal to the auxiliary light controller 150 such that the auxiliary light controller 150 can, at least in part, operably control the operation of the auxiliary lights 142, 144, 146, 148. In the illustrated embodiment, the sensors 160, 162, 164, 166 are wired directly to the auxiliary light controller 150. However, in other embodiments, the vehicle light sensors 160, 162, 164, 166 can wirelessly communicate with the auxiliary light controller 150 using any wireless communication protocol such as Bluetooth, WiFi, infrared, sonar, etc.

One independent feature of the auxiliary lighting system 140 is that the auxiliary lighting system 140 activates upon activation of the vehicle marker lights 104. The auxiliary lighting system 140 is thus configured to activate when auxiliary light controller 150 receives a vehicle marker light operational state signal from one or more of the vehicle marker light sensors 160 that indicates that one or more of the vehicle marker light sensors 160 is active. The reason for activating the auxiliary lighting system based on an active operational state of the vehicle marker light 104 is that, as outlined above, most vehicles include an operational state for the vehicle lighting system in which the marker lights 104 may be active while the vehicle headlights are typically, except during flash to pass activities, in active. Thus, a user may activate the auxiliary lighting system 140 using controls that are part of the standard vehicle lighting system to activate the auxiliary lighting system. More particularly, the user can simply switch the manually actuable vehicle light control 118 to Marker Light mode to activate the auxiliary lighting system 140 without also turning on the vehicle headlights.

With the manually actuable vehicle light control 118 in Marker Light mode, the vehicle marker lights 104 will activate. The activation of the vehicle marker lights 104 will be sensed by the vehicle marker light sensors 160 and a vehicle marker light operational state signal will be sent to the auxiliary light controller 150 and the auxiliary light controller 150 will transition to an active state. In some implementations, activation of the auxiliary light controller 150 upon receipt of the vehicle marker light operational state signal indicating that the vehicle marker light is active will cause the auxiliary light controller 150 to automatically activate the auxiliary headlight, e.g. one or both of the auxiliary high beam light 146 and/or auxiliary low beam light 148.

Figure 2:
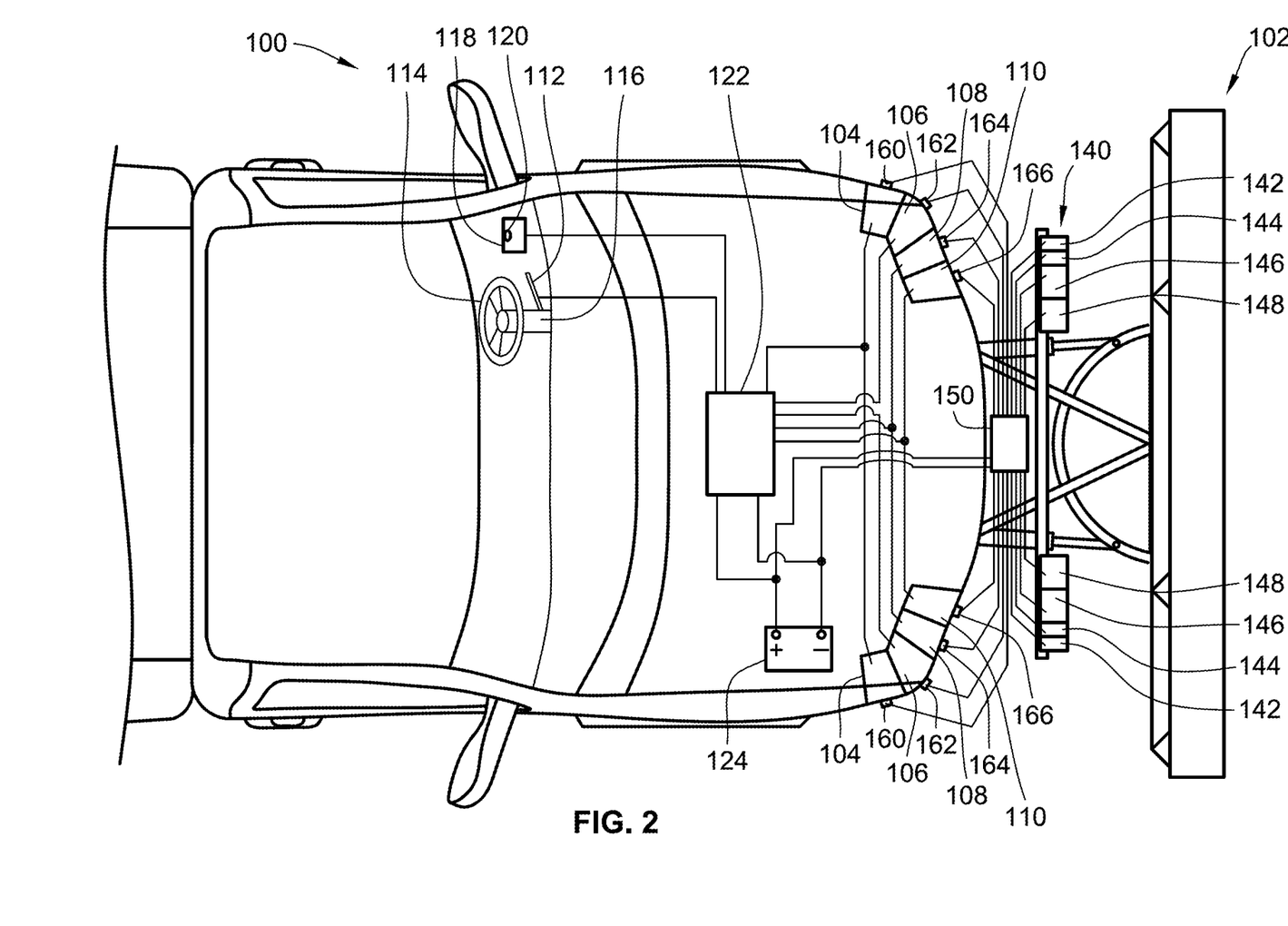
FIG. 2 is an enlarged partial illustration of the vehicle of FIG. 1 including the auxiliary device and auxiliary lighting system.

In the embodiment illustrated in FIG. 2, the vehicle light sensors 160, 162, 164, 166 are photoelectric devices that sense the intensity of light produced by the corresponding vehicle lights 104, 106, 108, 110. These vehicle light sensors 160, 162, 164, 166 do not electrically connect into the vehicle lighting system. Because these vehicle light sensors 160, 162, 164, 166 do not electrically connect into the vehicle lighting system, various ones of the problems outlined above do not occur. More particularly, the computer of the vehicle that monitors various operations of the vehicle will not get signals that changes in the vehicle lighting system have occurred nor will there be false signals that a trailer or other device is being towed by the vehicle such that any backup cameras or sensors are deactivated, such as systems that connect into the trailer plug of a vehicle.

The vehicle light sensors 160, 162 164, 166 are aimed toward the corresponding vehicle lights 104, 106, 108, 110. In one implementation, the vehicle light sensors 160, 162, 164, 166 are directly secured to the outer lens of the corresponding vehicle light 104, 106, 108, 110.

As such, the vehicle marker light sensor 160 will monitor the intensity of the vehicle marker light 104 and send a corresponding vehicle marker light operational state signal to the auxiliary light controller 150. Based on this vehicle marker light operational state signal, the auxiliary light controller 150 will activate or keep deactivated the auxiliary headlights (e.g. send power to or not send power to the auxiliary head lights).

These vehicle light sensors 160, 162, 164, 166 face the vehicle 100, e.g. in this embodiment, they face away from the auxiliary device 102 and toward vehicle 100. Again, they are aimed to sense the light of the vehicle 100 with which the auxiliary device 102 is associated.

In a particular embodiment, the auxiliary light controller 150 has an auxiliary light control on state wherein at least one of the auxiliary high beam light 146 and the auxiliary low beam light 148 is active and an auxiliary light control off state wherein both of the auxiliary high beam light 146 and the auxiliary low beam light 148 are inactive. The auxiliary light controller 150 switches from the auxiliary light control off state to the auxiliary light control on state upon receipt of a vehicle marker light operational state signal indicating that at least one vehicle marker light 104 is active.

Further, in some implementations, the auxiliary light controller 150 will immediately switch from the auxiliary light control on state to the auxiliary light control off state when the vehicle marker light operational state signal indicates that the vehicle marker light 104 is inactive. Alternatively, in some embodiments, the auxiliary light controller 150 will switch from the auxiliary light control on state to the auxiliary light control off state only after a predetermined amount of time has passed after a vehicle marker light operational state signal indicating that the vehicle marker light 104 is inactive has been received. This can help prevent flickering of the auxiliary headlights and reduce the likelihood of undesirable turning off of the auxiliary headlights.

In some implementations, a further independent feature is that the auxiliary light controller 150 will operably control the auxiliary marker lights 160, e.g. by controlling power thereto, such that the auxiliary marker lights 160 match the operational state of the vehicle marker lights 104.

A further independent feature of some implementations is that the manually actuable controls of the vehicle lighting system can be used to control the auxiliary headlight. More particularly, the user can use the manually actuable headlight control 112 to switch between an auxiliary high beam mode in which the auxiliary high beam light 146 is activated and an auxiliary low beam mode in which the auxiliary low beam light 148 is activated. Typically, in the auxiliary high beam mode, the auxiliary low beam light 148 is deactivated and in the auxiliary low beam mode, the auxiliary high beam light 146 is deactivated. However, as outlined above for the vehicle headlight, switching between a high beam and low beam may simply be done by leaving the low beam active and activating the high beam function. Alternatively, a change in power may be provided. However, any of these situations can be considered controlling both an operational state of the auxiliary high beam light and the operational state of the auxiliary low beam light. For example controlling an operational state of the auxiliary high beam and controlling the operational state of the auxiliary low beam light may be increasing/decreasing power to a single filament/bulb, deactivating/activating one filament and activating/deactivating another filament, leaving one filament/bulb active while activating/deactivating a second filament (e.g. leaving the low beam active at all times while toggling the high beam on and off).

More particularly, the auxiliary light controller 150 receives a vehicle headlight operational state signal from the vehicle headlight sensor, illustrated in the form of vehicle high beam light sensors 164 and vehicle low beam light sensors 166 related to the operational state of the vehicle headlights. The auxiliary light controller 150 controls an operational state of the auxiliary high beam light 108 based on the vehicle headlight operational state signal and controls the operational state of the auxiliary low beam light 110 based on the vehicle headlight operational state signal.

When the auxiliary light controller 150 senses a change in the operational state of the vehicle headlight, the auxiliary light controller 150 will also make a change in the operational state of the auxiliary head light. For example, when the auxiliary light controller 150 receives a vehicle headlight operational signal that one or both of the vehicle high beam light 108 and/or the vehicle low beam light 110 has been activated the auxiliary light controller 150 can switch between the auxiliary high beam mode and the auxiliary low beam mode. Because vehicles are typically equipped with the flash to pass capabilities where the vehicle headlight will activate upon manipulation of the manually actuable headlight control 112 even with vehicle headlight in an inactive state, this flash to pass capability can be used to signal a change in the operational state of the vehicle headlights which is used to trigger a change in the operational state of the auxiliary headlights, e.g. a changing between the auxiliary high beam mode and the auxiliary low beam mode. A significant benefit of this arrangement is that the user is already trained to switch between dims and brights using the same exact control for the vehicle head lights. Further, this avoids requiring a user to find a switch on a separate controller of the auxiliary device to switch between the auxiliary low beam mode and the auxiliary high beam mode, which can cause a user to take their eyes off of their surrounding environment.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

Figure 3:
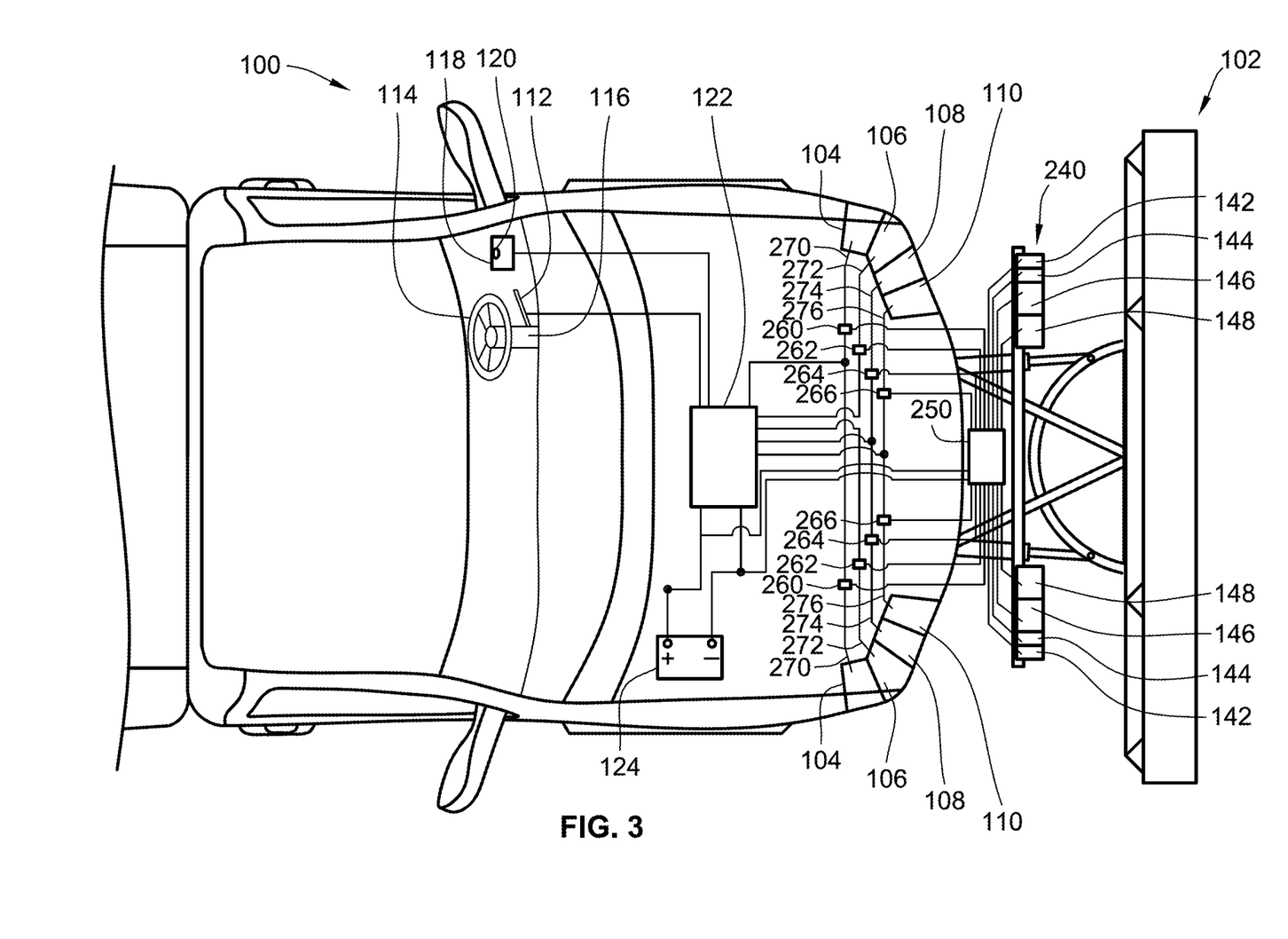
FIG. 3 is an enlarged partial illustration of the vehicle of FIG. 1 including the auxiliary device and an alternative auxiliary lighting system.

The auxiliary lighting system 240 includes vehicle marker light sensors 260, vehicle turn signal light sensors 262, vehicle head light sensors in the form of vehicle high beam light sensors 264 and vehicle low beam light sensors 266, again, that are operably connected to an auxiliary light controller 250.

Again, the vehicle light sensors 260, 262, 264, 266 do not electrically connect into the vehicle lighting system to avoid the problems outlined above. However, in this implementation, the vehicle light sensors 260, 262, 264, 266 are hall effect sensors that sense the magnetic field of a vehicle light wire associated with a corresponding vehicle light 104, 106, 108, 110. More particularly, vehicle marker light sensors 260 sense the magnetic field produced by vehicle marker light wires 270 associated with activating the vehicle marker lights 104 to create a vehicle marker light operational state signal. Vehicle turn signal light sensors 262 sense the magnetic field produced by vehicle turn signal light wires 272 associated with activating the vehicle turn signal lights 106 to create a vehicle turn signal light operational state signal. Vehicle high beam light sensors 264 sense the magnetic field produced by vehicle high beam light wires 274 associated with activating the vehicle high beam lights 108 to create a vehicle high beam light operational state signal. Vehicle low beam light sensors 266 sense the magnetic field produced by vehicle low beam light wires 276 associated with activating the vehicle low beam lights 110 to create a vehicle low beam light operational state signal.

More particularly, when power is sent across any of the wires 270, 272, 274, 276, the magnetic field generated thereby will change. This will change the signal sent by the corresponding vehicle light sensors 260, 262, 264, 266 allowing the auxiliary light controller 250 change operation and properly power the desired auxiliary lights. While wires extending between the vehicle light controller 122 and the corresponding vehicle lights 104, 106, 108, 110 are sensed, other wires associated with activating the particular vehicle lights 104, 106, 108, 110 may be sensed. For instance, wires extending between the vehicle light controller 122 and the manually actuable headlight control 112 and the manually actuable vehicle light control 118 may be sensed to produce the appropriate vehicle light operational state signals.

Figure 4:
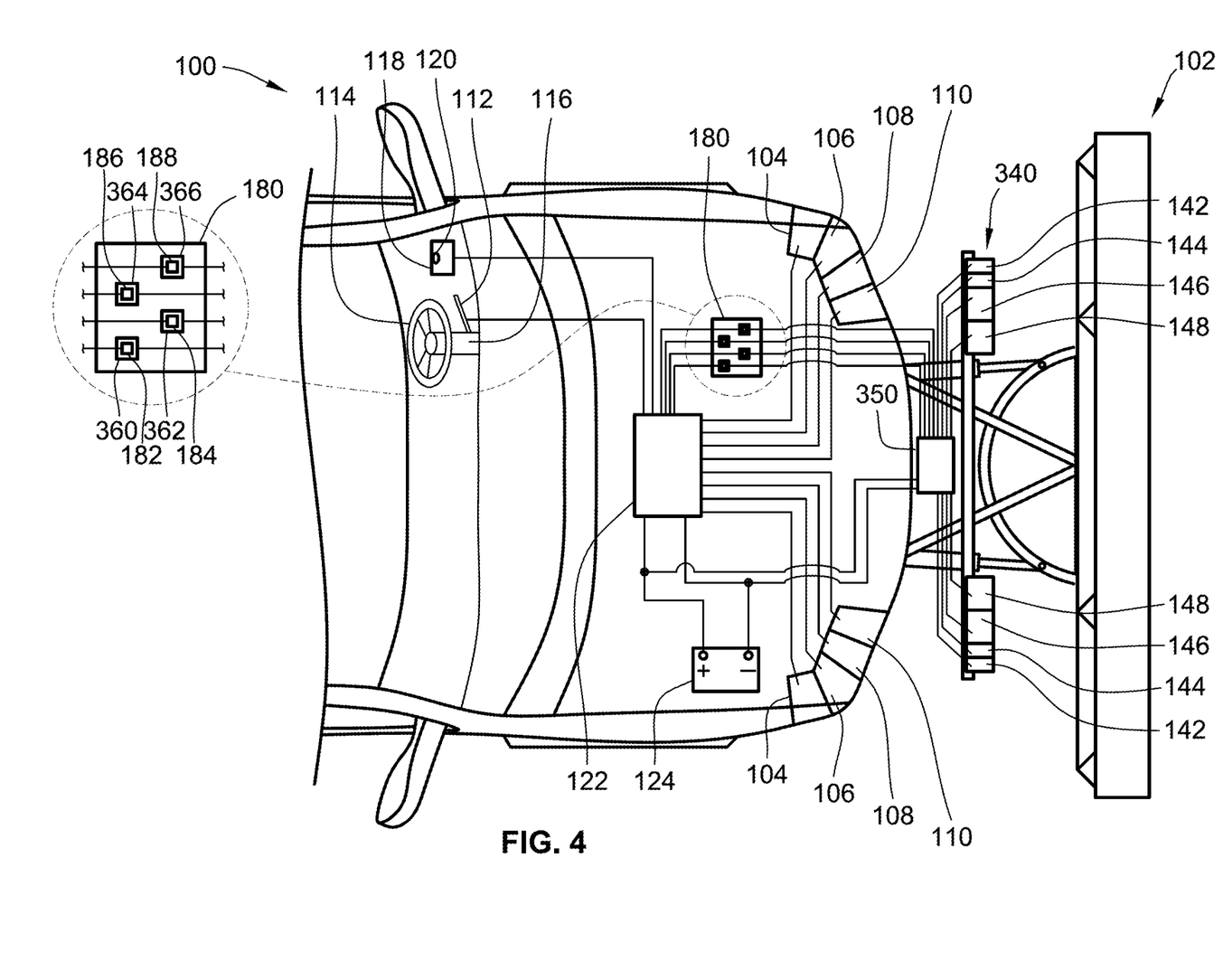
FIG. 4 is an enlarged partial illustration of the vehicle of FIG. 1 including the auxiliary device and an alternative auxiliary lighting system.

FIG. 4 illustrates a further embodiment of an auxiliary lighting system 340 for use with auxiliary device 102. This auxiliary lighting system 340 operates in substantially the same way as the prior auxiliary lighting systems 140, 240. However, in this embodiment, the auxiliary lighting system 340 directly electrically connects into the vehicle lighting system.

In this system, the vehicle lighting system further includes a fuse box 180 that includes a vehicle marker light fuse 182, a vehicle turn signal light fuse 184, one or more vehicle headlight fuses illustrated in the form of a vehicle high beam light fuse 186, and a vehicle low beam light fuse 188.

The auxiliary lighting system 340 includes vehicle marker light sensor 360, vehicle turn signal light sensor 362, vehicle head light sensor in the form of vehicle high beam light sensor 364 and vehicle low beam light sensor 366. These sensors are fuse circuit taps that plug into the slot where the standard fuse plugs into the vehicle lighting system. Here, the corresponding vehicle light operational signals are in the form of electrical current or electrical voltage sensed using the fuse circuit taps. This system electrically connects into the vehicle lighting system, but still overcomes some of the problems with prior systems in that the particular location of the tap may not cause computer errors, the amount of load is so limited that it may not cause computer errors, it does not plug into trailer plugs that can disable back up cameras or sensors.

A further auxiliary lighting system, not illustrated, uses direct wire taps that pierce through the insulation of wires associated with activating the vehicle lights 104, 106, 108, 110. These direct wire taps directly electrically connect into the vehicle lighting system.

Figure 5:
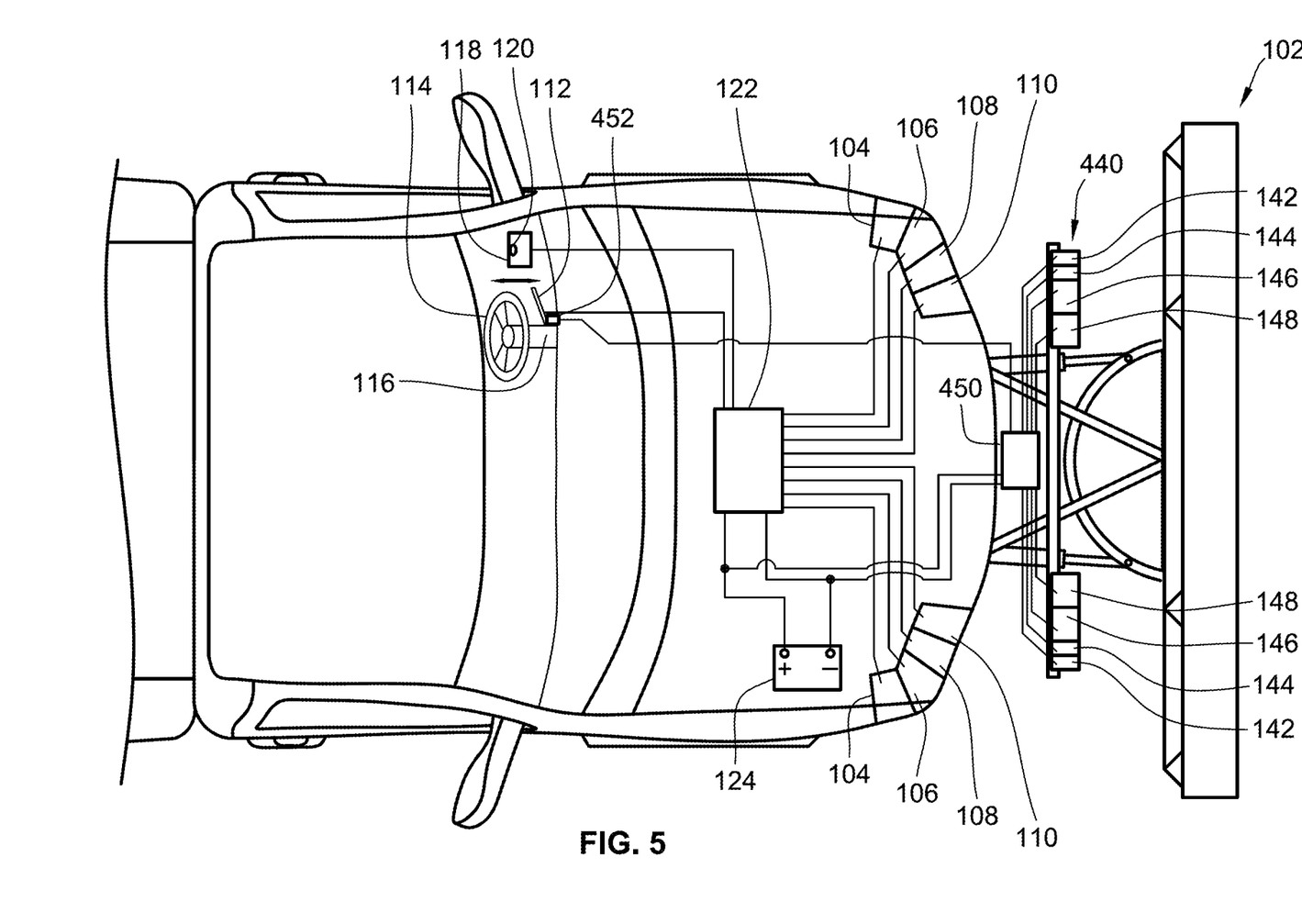
FIG. 5 is an enlarged partial illustration of the vehicle of FIG. 1 including the auxiliary device and an alternative auxiliary lighting system.

FIG. 5 illustrates a simplified auxiliary lighting system 440. The auxiliary lighting system 440 may include many of the features outlined above. However, in this embodiment, a vehicle headlight sensor 452 configured to sense the operation state of the vehicle headlights is provided adjacent manually actuable headlight control 112. The vehicle head light sensor 452 may be a proximity sensor, a mechanical switch or other device used to sense a position of the manually actuable headlight control 112. The vehicle headlight sensor 452 is operably coupled to auxiliary light controller 450 to send signals to the auxiliary light controller 450. This is another way to use the manually actuable headlight control 112 to change the operational state of the auxiliary headlight, e.g. to switch between an auxiliary high beam mode and an auxiliary low beam mode.

This embodiment can work with a manually actuable headlight control 112 that switches between a first position for a vehicle high beam mode and a second fixed position for a vehicle low beam mode. In this embodiment, the manually actuable headlight control 112 remains in the first or second position upon release of the manually actuable headlight control 112 by the user. This embodiment can also work for a manually actuable headlight control 112 that has a normal position and an actuated position but that automatically returns to the normal position when the user releases the manually actuable headlight control 112. In this implementation, each time the manually actuable headlight control 112 is actuated to the actuated position, the auxiliary light controller 450 can change the operational state of the auxiliary head light.

While illustrated as a wired system, the vehicle headlight sensor 452 could be wireless.

Figure 6:
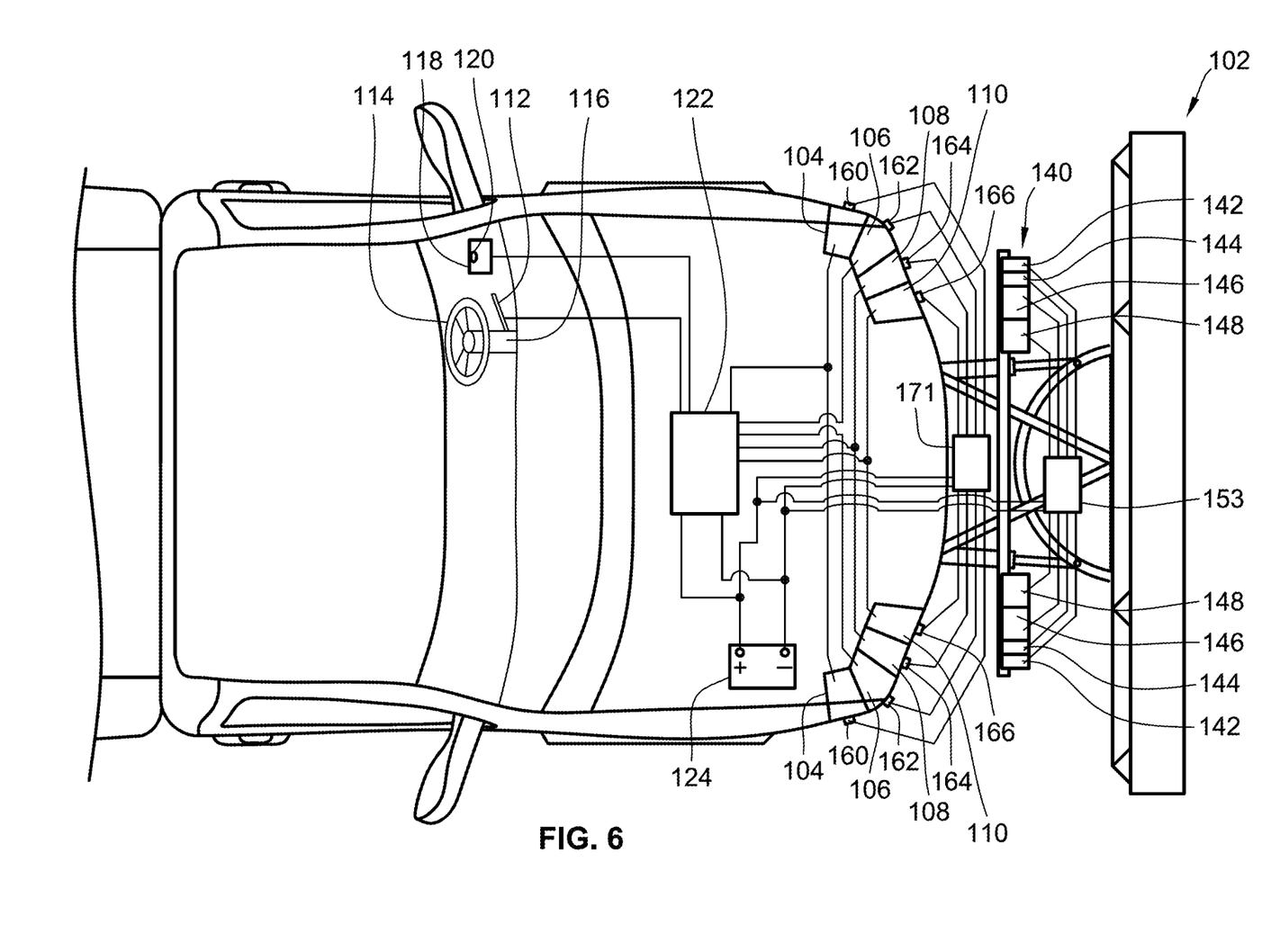
FIG. 6 is an enlarged partial illustration of the vehicle of FIG. 1 including the auxiliary device and an alternative auxiliary lighting system.

FIG. 6 illustrates a further implementation. In this embodiment, there is wireless communication operably between the vehicle light sensors 160, 162, 164, 166 and the auxiliary light controller 153. In this embodiment, a wireless radio 151 sends signals to the auxiliary light controller 153 wirelessly.

In alternative embodiments, each vehicle light sensor 160, 162, 164, 166 could include a wireless radio and directly wirelessly communicate with the auxiliary light controller.

With reference to FIG. 2, the auxiliary lights, e.g. lights 142, 144, 146, 148 can be mounted to the auxiliary device 102 or could otherwise be mounted to the vehicle 100. Further, the auxiliary light controller 150 could be mounted on the vehicle 100, e.g. under the hood/in the engine compartment of the vehicle 100, or could, as illustrated, be mounted on the auxiliary device 102.

The vehicle light controller 122 and auxiliary light controller 150 shall have all necessary microprocessors, storage, communication circuits (e.g. which may include among other things wireless radios and receivers), power control circuitry (e.g. for controlling power to the corresponding auxiliary lights, which may include, among other things, switches and relays) and other electrical devices necessary to perform the required functions thereof. These electrical devices may be in a single module or separated into separate modules. Further, some parts of the controllers may be located on the vehicle 100 while other parts of the controllers may be located on the auxiliary device 102.

Figure 7:
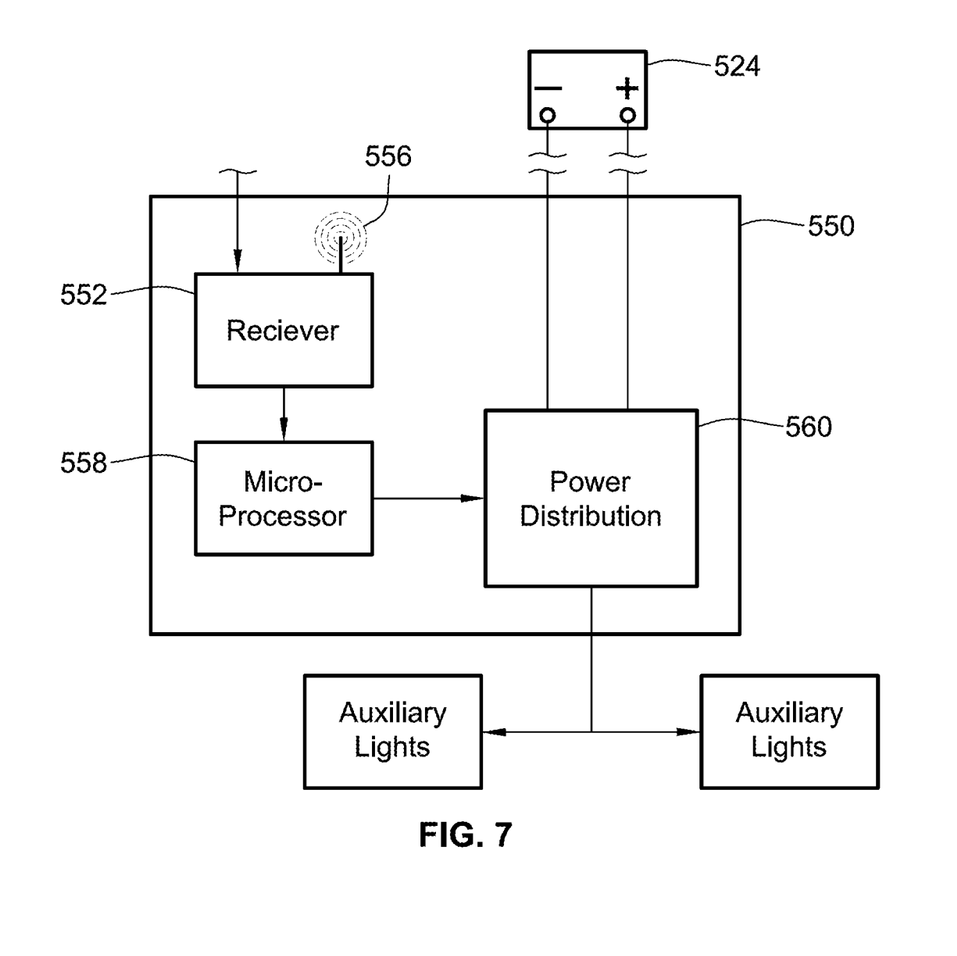
FIG. 7 is a schematic illustration of an auxiliary light controller useable in the auxiliary lighting systems.

FIG. 7 is a schematic representation of an auxiliary light controller 550 useable in one or more of the auxiliary lighting systems described above. The auxiliary light controller 550 includes a receiver 552 configured to receive signals from, one or more of the vehicle light sensors. The receiver 552 may receive the signals via wired connection 554 or wireless communication 556 or a combination thereof.

The receiver 552 communicates the signals to a microprocessor 558. The microprocessor 558 can use the signals to determine how to properly control the various auxiliary lights of the auxiliary lighting system. The microprocessor 558 can then control power distribution circuitry 560 that properly regulates power from a power source 524. Again, the power source 524 could be the standard power source 124 provided by a vehicle 100 (e.g. the battery) or alternatively could be a dedicated power source provided for the auxiliary lighting system. However, such a dedicated power source could be recharged using the standard vehicle electrical system (e.g. alternator).

The power distribution circuitry could be provided by appropriate switches, relays, transistors, field-effect transistor, etc.

In some embodiments, a microprocessor is not required by the auxiliary light controller. For example, the signals sent from the vehicle light sensors can be used by the power distribution circuitry 560 to adjust the power supplied to the various auxiliary lights, such as by way of appropriately wired switches, relays, transistors, field-effect transistors, etc.

Figure 8:
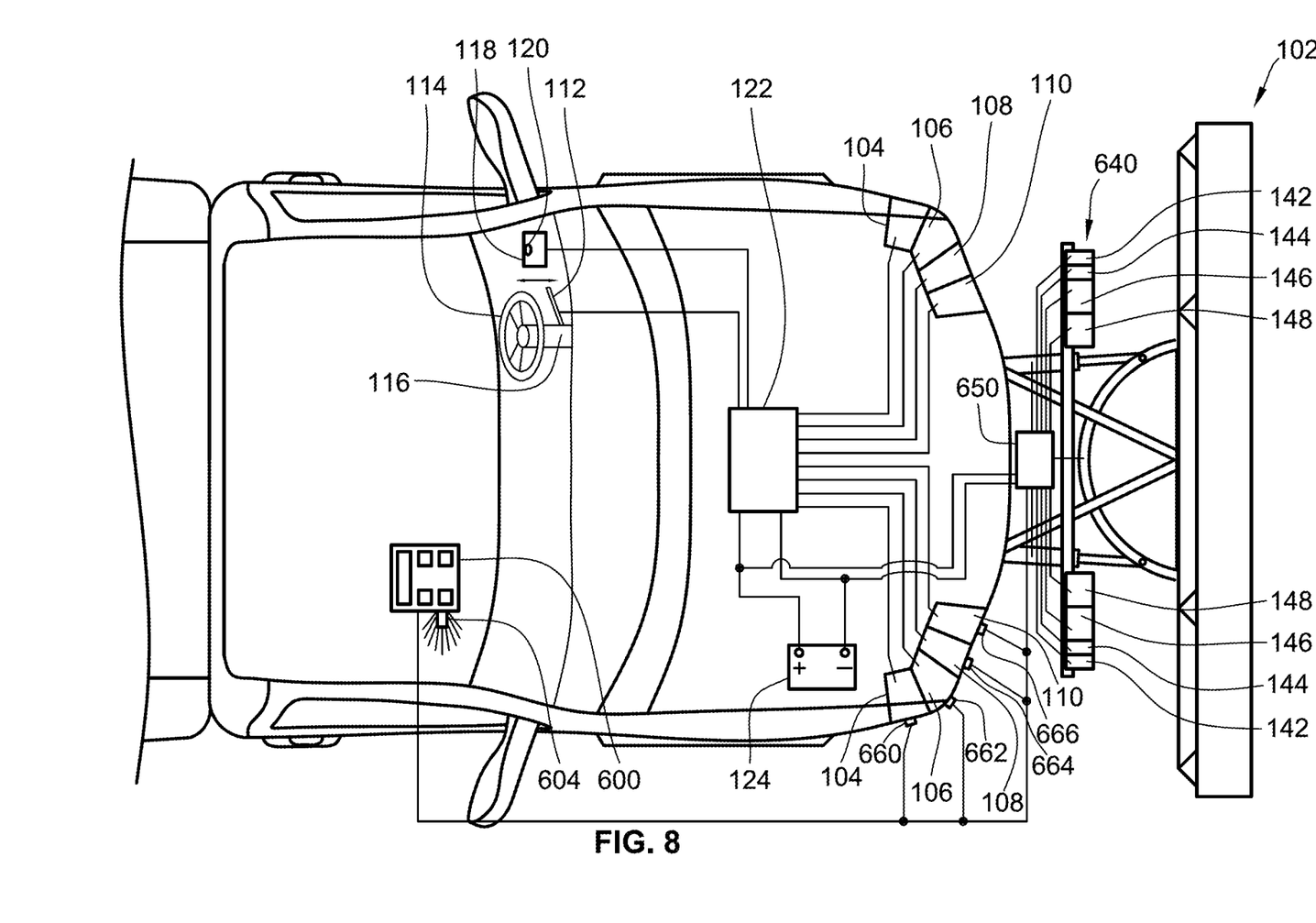
FIG. 8 is an enlarged partial illustration of the vehicle of FIG. 1 including the auxiliary device and an alternative auxiliary lighting system.

FIG. 8 illustrates a further configuration, in simplified form. In this configuration, a manually actuable auxiliary device controller 600 is illustrated. The manually actuable auxiliary device controller 600 is a manually actuable to control one or more operations of the auxiliary device 102. For instance, if the auxiliary device is a snowplow, the user can use the manually actuable auxiliary device controller 600 to control raising and lowering the snowplow blade, changing an angle of the snowplow blade, actuating wing members of the snowplow blade, etc.

In this implementation, the auxiliary light controller 650 forms part of the system for controlling these operations of the auxiliary device 102. As such, the auxiliary light controller 650 need not be a separate controller from a controller for controlling those operations of the auxiliary device. Further, the wiring 602 could be used to carry signals generated by the vehicle light sensors 660, 662, 664, 666 to the auxiliary light controller 650. In such an embodiment, where the manually actuable auxiliary device controller 600 is tied into the auxiliary lighting system 640, feedback as to the status of the auxiliary lighting system 640 can be sent back to the user. For example, the manually actuable auxiliary device controller 600 could include indication lighting 604 that indicates which, if any, auxiliary lights 142, 144, 146, 148 are active. Additionally, such indication lighting 604 could indicate whether or not the system is in a high beam mode or a low beam mode. Further yet, such indication lighting 604 could indicate if the auxiliary lighting system 640 is active or inactive (e.g. whether or not a vehicle marker light 104 is active for some of the embodiments identified above).

While illustrated as being wired, alternative systems could have the manually actuable auxiliary device controller 600 wirelessly communicate with a controller of the auxiliary device.

While prior discussions focused on vehicle lights at the front of the vehicle, other lights located at the rear of the vehicle and on top of the vehicle could also be monitored in a same manor.

Further, while multiple of the same type of lights are monitored in various embodiments, some embodiments may only monitor a single one of a particular type of light (e.g. marker light, high or low beam light). However, it is desired to monitor multiple lights, if available, so as to provide redundancy in the system in the event that one of the vehicle lights burns out or otherwise malfunctions. Further, both right and left vehicle turn signal lights will likely need to be monitored to properly control the right and left auxiliary turn signal lights.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. An auxiliary lighting system for use with an auxiliary device useable with a vehicle, the vehicle having a vehicle lighting system including a vehicle marker light, a vehicle headlight that includes a vehicle low beam light and a vehicle high beam light, a manually actuable headlight control for switching between operational states of the vehicle headlight and a manually actuable vehicle light control having a vehicle marker light on state wherein the vehicle marker light is active and the vehicle headlights are inactive and a headlight on state wherein the vehicle headlight is active, the auxiliary lighting system comprising:
   an auxiliary headlight;
   a marker light sensor configured to sense an operational state of the vehicle marker light;
   an auxiliary light controller operably connected to the vehicle marker light sensor to receive a marker light operational state signal related to the operational state of the vehicle marker light from the vehicle marker light sensor, the auxiliary light controller operable to activate the auxiliary headlight when the vehicle marker light operational state signal indicates that the vehicle marker light is active.

2. The auxiliary lighting system of claim 1, wherein the vehicle marker light sensor is a hall effect sensor that can sense a magnetic field of a vehicle marker light wire associated with activating the vehicle marker light without electrically connecting to the vehicle marker light or the vehicle marker light wire.

3. The auxiliary lighting system of claim 1, wherein the vehicle marker light sensor is a photoelectric device that senses light intensity of the vehicle marker light without electrically connecting to the vehicle marker light or the vehicle marker light wire.

4. The auxiliary lighting system of claim 1, wherein the vehicle marker light sensor is electrically connected to the vehicle marker light or vehicle marker light wire associated with activating the vehicle marker light.

5. The auxiliary lighting system of claim 1, wherein the vehicle marker light sensor is not electrically connected to the vehicle lighting system to sense the operation state of the vehicle marker light.

6. The auxiliary lighting system of claim 1, further comprising an auxiliary marker light, wherein the auxiliary light controller is operable to control power to the auxiliary marker light, wherein the auxiliary light controller controls power to the auxiliary marker light such that the auxiliary marker light matches the operational state of the vehicle marker light.

7. The auxiliary lighting system of claim 1, wherein:
the auxiliary light control has:
an auxiliary light control on state wherein the auxiliary headlight is active;
an auxiliary light control off state wherein the auxiliary headlight is inactive;
the auxiliary light control switches from the auxiliary light control on state to the auxiliary light control off state when the auxiliary light control receives a vehicle marker light operational state signal indicating the vehicle marker light is inactive for at least a predetermined length of time.

8. The auxiliary lighting system of claim 7, wherein the auxiliary light control does not switch from the auxiliary light control on state to the auxiliary light control off state when the auxiliary light control receives a vehicle marker light operational state signal indicating the marker light is inactive for less than the predetermined length of time.

9. A method of controlling auxiliary lighting system for use with an auxiliary device useable with a vehicle, the vehicle having a vehicle lighting system including a vehicle marker light, a vehicle headlight that includes a vehicle low beam light and a vehicle high beam light, a manually actuable headlight control for switching between operational states of the vehicle headlight and a manually actuable vehicle light control having a vehicle marker light on state wherein the vehicle marker light is active and the vehicle headlights are inactive and a headlight on state wherein the vehicle headlight is active, the method comprising:
sensing, with a vehicle marker light sensor, an operational state of the vehicle marker light;
sending, to an auxiliary light controller, a vehicle marker light operational state signal indicating the operational state of the vehicle marker light;
receiving, by the auxiliary light controller, the vehicle marker light operational state signal; and
activating, with the auxiliary light controller, an auxiliary headlight of the auxiliary lighting system when the vehicle marker light operational state signal indicates that the vehicle marker light is active.

10. The method of claim 9, wherein the vehicle marker light sensor is a hall effect sensor that can sense a magnetic field of a vehicle marker light wire associated with activating the vehicle marker light;
wherein sensing the operational state of the vehicle marker light does not require electrically connecting to the vehicle marker light or the vehicle marker light wire.

11. The method of claim 9, wherein the vehicle marker light sensor is a photoelectric device that senses light intensity of the vehicle marker light;
wherein sensing the operational state of the vehicle marker light does not require electrically connecting to the vehicle marker light or the vehicle marker light wire.

12. The method of claim 9, wherein the vehicle marker light sensor is electrically connected to a vehicle marker light wire associated with activating the vehicle marker light.

13. The method of claim 9, wherein the vehicle marker light sensor is not electrically connected to the vehicle lighting system to sense the operation state of the vehicle marker light.

14. The method of claim 9, further comprising controlling an auxiliary marker light operably coupled to the auxiliary light controller to match the operational state of the vehicle marker light.

15. The method of claim 9, further comprising switching, by the auxiliary light control, from an auxiliary light control on state wherein the auxiliary headlight is active to an auxiliary light control off state wherein the auxiliary headlight is inactive when the auxiliary light control receives a vehicle marker light operational state signal indicating the vehicle marker light is inactive for at least a predetermined length of time.

16. The method of claim 15, further comprising maintaining the auxiliary light control in the auxiliary light control on state when the auxiliary light control receives a vehicle marker light operational state signal indicating the marker light is inactive for less than the predetermined length of time.

* * * * *